(12) United States Patent
Cortopassi et al.

(10) Patent No.: US 7,119,706 B1
(45) Date of Patent: *Oct. 10, 2006

(54) METHOD AND APPARATUS FOR VISUAL SILENT ALARM INDICATOR

(75) Inventors: Michael Cortopassi, Arlington Heights, IL (US); Eric Fuhs, Crystal Lake, IL (US); Wayne Hile, Round Lake Park, IL (US); Thomas Robinson, Crystal Lake, IL (US); Edward Endejan, Gurnee, IL (US)

(73) Assignee: Palm, Inc, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/950,282

(22) Filed: Sep. 23, 2004

Related U.S. Application Data

(63) Continuation of application No. 09/607,894, filed on Jun. 30, 2000, now Pat. No. 6,831,568.

(51) Int. Cl.
*G08B 5/00* (2006.01)
(52) U.S. Cl. .............................. 340/815.4; 340/815.45; 340/573.1; 340/309.16; 345/1.1; 361/681
(58) Field of Classification Search ............. 340/815.4, 340/815.45, 825.36, 571, 573.1, 568.1, 309.16; 345/117, 961, 1.1, 618; 362/26; 361/681, 361/683; 348/43
See application file for complete search history.

(56) References Cited

U.S. PATENT DOCUMENTS

| | | | | | |
|---|---|---|---|---|---|
| 5,210,532 | A | * | 5/1993 | Knoedler et al. | 340/825.69 |
| 5,546,078 | A | * | 8/1996 | Motohashi et al. | 340/7.61 |
| 5,570,025 | A | * | 10/1996 | Lauritsen et al. | 324/433 |
| 5,796,575 | A | * | 8/1998 | Podwalny et al. | 361/681 |
| 5,973,612 | A | * | 10/1999 | Deo et al. | 340/7.58 |
| 6,144,363 | A | * | 11/2000 | Alloul et al. | 345/618 |
| 6,310,634 | B1 | * | 10/2001 | Bodnar et al. | 715/854 |
| 6,831,568 | B1 | * | 12/2004 | Cortopassi et al. | 340/815.4 |

* cited by examiner

*Primary Examiner*—Anh V. La

(57) ABSTRACT

An apparatus and method thereof wherein a portable computer system or personal digital assistant generates a visual signal in response to an occurrence of a programmed event. For example, the portable computer system can use a light emitting diode to visually signal an alarm at a specified time. The visual signal can be varied in order to indicate the type of event associated with the alarm. In one implementation, the visual signal blinks at a particular rate depending on the type of event. In another implementation, the visual signal blinks a prescribed number of times or according to a particular pattern depending on the type of event. When enabled, the visual signal is generated in lieu of an audible signal, thus providing to the user a silent alarm that does not disturb other people in proximity, such as in a meeting, a theater, or some other gathering.

20 Claims, 9 Drawing Sheets

METHOD AND APPARATUS FOR VISUAL SILENT ALARM INDICATOR

This application is a Continuation Application of the commonly-owned U.S. patent application with Ser. No. 09/607,894, filed Jun. 30, 2000, by M. Cortopassi et al., and entitled "Method and Apparatus for Visual Silent Alarm Indicator," now U.S. Pat. No. 6,831,568.

BACKGROUND OF THE INVENTION

1. Field of the Invention

The present invention relates to the field of portable computer systems such as personal digital assistants or palmtops. Specifically, the present invention relates to a method and apparatus for providing a silent visual indicator (e.g., an alarm) for portable computer systems.

2. Related Art

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

Because of the portability and convenience of palmtops, it is becoming increasingly desirable to increase the range of applications and functions for which they can be used. It is advantageous to expand the capabilities of a palmtop so that it can provide many of the same, if not the same, services provided by a personal computer (e.g., a desktop or laptop computer system), particularly with regard to access to the World Wide Web as well as the ability to communicate with other palmtops and personal computers. As such, information currently available via the Internet over personal computers, such as on-line access to news and financial information, can also be provided via a palmtop. In addition, a palmtop can be used for electronic mail ("e-mail") and multi-player gaming, and features such as voice recognition can also be added.

Palmtop computers are also used very frequently as personal calendars, containing a user's schedule of meetings, appointments, and other items of significance such as birthdays and anniversaries. The user can open (e.g., display) the calendar to check for upcoming events. In addition, palmtops are generally equipped with an alarm that provides an audible indication to a user of an imminent appointment.

The audible alarm currently used in palmtops is problematic because it is not appropriate for all situations and cannot be used by the hearing impaired. In an environment that is supposed to be quiet (such as a theater), the audible signal can be disruptive and impolite. In an environment where there are many palmtop users (such as a business meeting), there are many occasions when multiple palmtops will sound their alarms at about the same time. In these situations, the sound of multiple alarms is exceptionally disruptive. In addition, it is not easy to trace an audible alarm to its source, and so there will also be some initial confusion while people try to determine whether it is their palmtop that is creating the alarm, further disrupting the meeting.

Furthermore, because of their disruptive nature, audible alarms cannot always be used to signal events other than appointments, etc. That is, there may be a number of conditions associated with the different functions and applications mentioned above for which a user may wish to receive an alert, but with an audible alarm the signals may be virtually continuous, especially in an environment where multiple palmtops are present. Thus, instead of being subjected to too much noise, or subjecting others nearby to the noise, a user may elect to not receive an audible alarm when he or she would really rather have one.

On the other hand, an audible signal can also be problematic in a noisy environment. It may not be possible to hear an audible alarm over the surrounding noise, in this case rendering the alarm useless.

SUMMARY OF THE INVENTION

Accordingly, what is needed is an apparatus and/or method that can be used in a portable computer system and that adds or maintains the functionality of an audible alarm, but addresses the shortcomings of an audible alarm. Also, what is needed is an apparatus and/or method that satisfies the above need and increases the number of conditions or events for which an alarm can be used, in particular for a portable computer system environment where the number of applications and functions are increasing. The present invention provides these advantages and others not specifically mentioned above but described in the sections to follow.

An apparatus and method thereof are described, in which a portable computer system or personal digital assistant is adapted to generate a visual signal in response to the occurrence of a programmed event. In one embodiment, the portable computer system uses a light emitting diode to visually signal an alarm at a specified time. When enabled, the visual signal is generated in lieu of an audible signal, thus providing to the user a silent alarm that does not disturb other people in proximity.

The visual signal can be varied in order to indicate the type of event or condition associated with the alarm. In one implementation, the visual signal blinks at a particular rate depending on the type of event. In another implementation, the visual signal blinks a prescribed number of times or according to a particular pattern depending on the type of event. In yet another implementation, the visual signal uses different colors depending on the type of event. The visual signal can thus be used to signal a wide variety of different events, and in particular can do so in an unobtrusive manner.

In one embodiment, the visual signal is disposed such that it is visible when the portable computer system is viewed either from the front or on edge. In another embodiment, one of the buttons of the portable computer system is made translucent or transparent, and the visual indicator is situated beneath the button. When activated, the visual signal can be seen through the button; therefore, the button performs its normal function and also serves to provide the visual signal. For example, in one implementation, the on/off button is located on the top edge of the front surface and so it can be seen when the portable computer system is viewed from the front or on edge. The on/off button can be made translucent and the visual indicator installed underneath it, and thus the button can perform both its normal function as well as the visual indicator function.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "causing" or "generating" or "varying" or "receiving" or "enabling" or "disabling" or the like, refer to the action and processes of a computer system (e.g., process 600 of FIG. 6), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Portable Computer System Network Environment

Figure 1A:
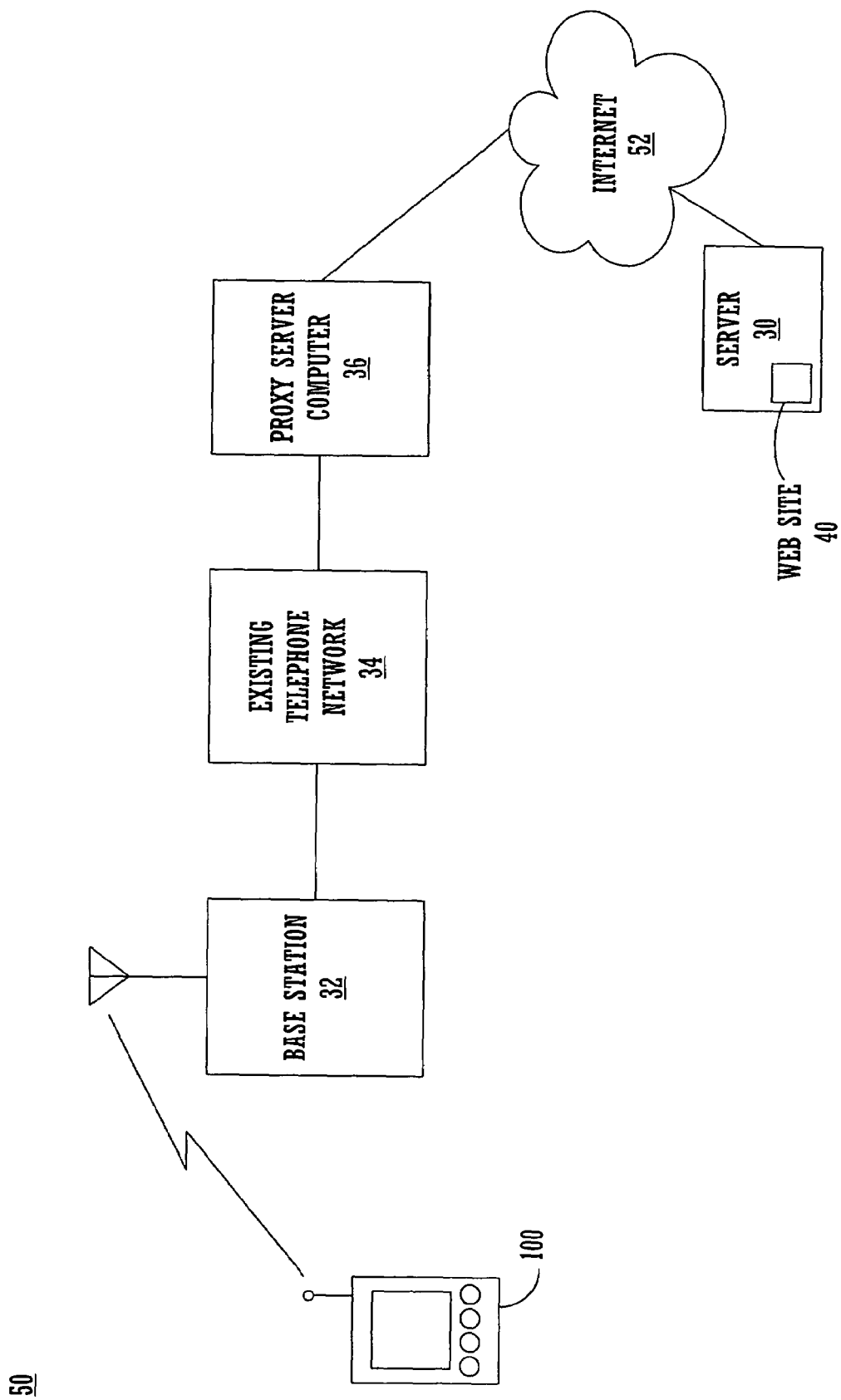
FIG. 1A is a block diagram of an exemplary network environment including a portable computer system in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system or as a personal digital assistant (PDA). In one embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52.

Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 1B:
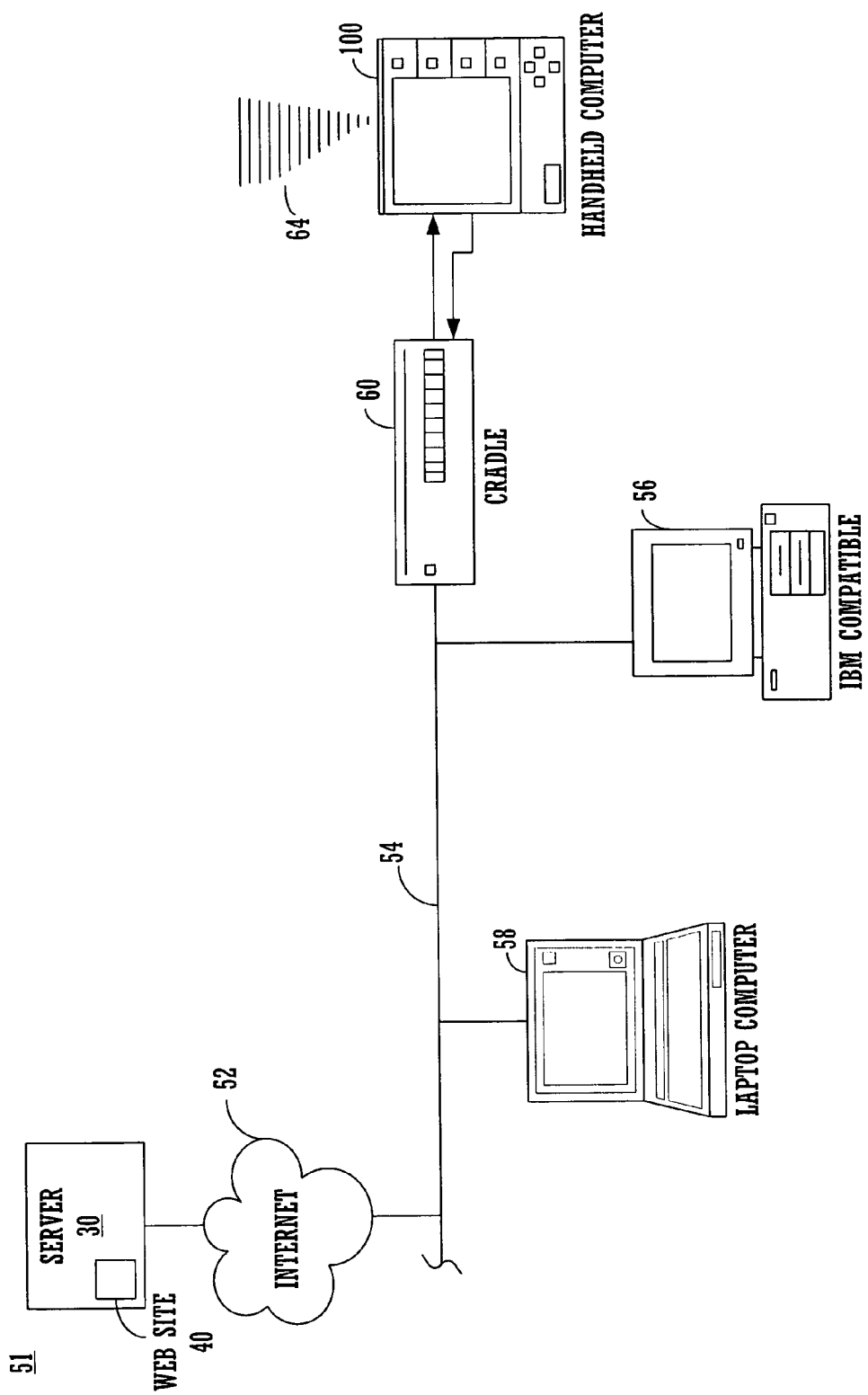
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Bus 54 can provide communication with the Internet 52 using a number of well-known protocols. Coupled with Internet 52 are multiple servers exemplified by server 30. Residing on server 30 is a Web site 40.

Importantly, bus 54 is also coupled to a cradle 60 for receiving and initiating communication with portable computer system 100 of the present invention. Cradle 60 provides an electrical and mechanical communication interface between bus 54 (and anything coupled to bus 54) and the computer system 100 for two-way communications. It is appreciated that, in accordance with the present invention, portable computer system 100 may instead be coupled to host computer systems 56 and 58 via a wireless (radio) connection. Computer system 100 also contains a wireless infrared communication mechanism 64 for sending and receiving information from other devices (e.g., "beaming").

With reference to both FIGS. 1A and 1B, it is appreciated that portable computer system 100 can be used in a network environment combining elements of networks 50 and 51. That is, portable computer system 100 can include both a wireless infrared communication mechanism and a signal (e.g., radio) receiver/transmitter device.

Figure 1C:
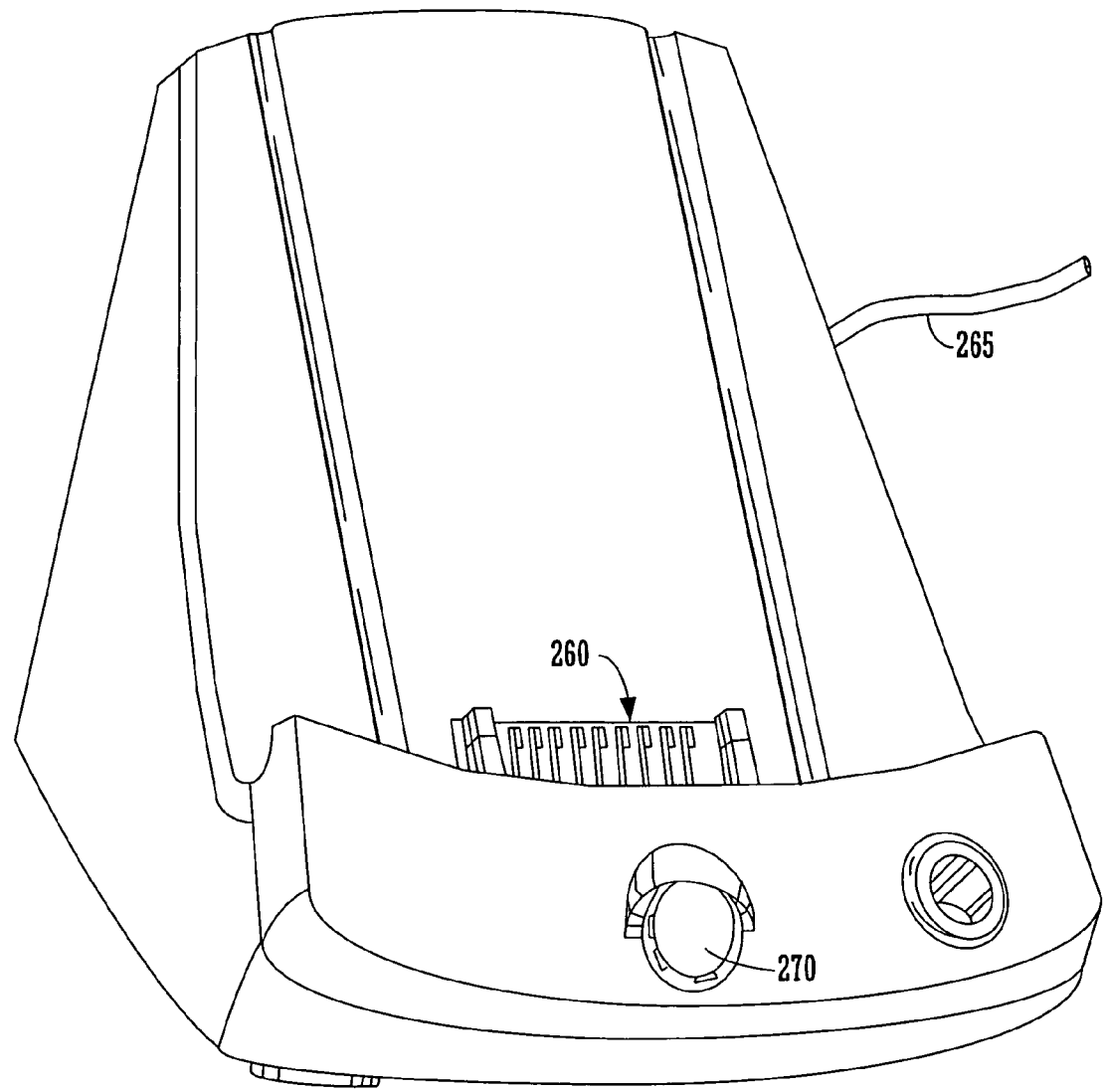
FIG. 1C is a perspective view of the cradle device for connecting the portable computer system to other systems via a communication interface in accordance with one embodiment of the present invention.

FIG. 1C is a perspective illustration of one embodiment of the cradle 60 for receiving the portable computer system 100. Cradle 60 contains a mechanical and electrical interface 260 for interfacing with communication interface 180 (FIG. 2B below) of computer system 100 when system 100 is slid into the cradle 60 in an upright position. Once inserted, button 270 can be pressed to initiate two-way communication (e.g., a communication session) between computer system 100 and other computer systems coupled to serial communication 265.

Apparatus for Visual Silent Alarm Indicator

Figure 2A:
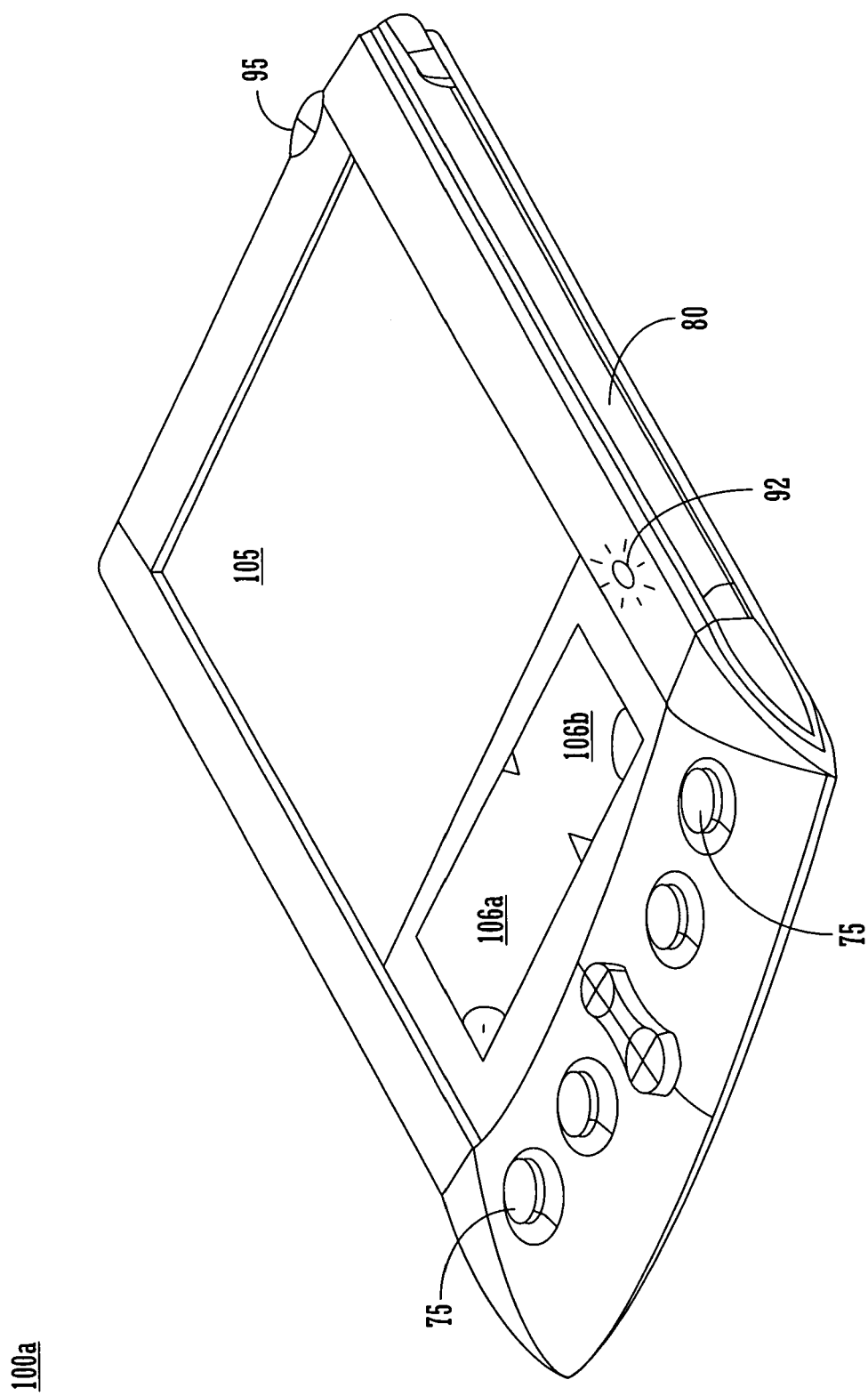
FIG. 2A is a top side perspective view of a portable computer system with a visual indicator in accordance with one embodiment of the present invention.

FIG. 2A is a perspective illustration of the top face 100*a* of the housing of one embodiment of the portable computer system 100 of the present invention. The top face 100*a* contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100*a* also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106*a* and 106*b*. Region 106*a* is for the drawing of alphabetic characters therein (and not for numeric characters) for automatic recognition, and region 106*b* is for the drawing of numeric characters therein (and not for alphabetic characters) for automatic recognition. The stylus 80 is used for stroking a character within one of the regions 106*a* and 106*b*. The stroke information is then fed to an internal processor for automatic character recognition. Once characters are recognized, they are typically displayed on the screen 105 for verification and/or modification.

In accordance with one embodiment of the present invention, a visual indicator 92 is situated on the top face 100*a* of portable computer system 100. Visual indicator 92 comprises a light emitting diode (LED) or some other type of illuminating or visible element. In another embodiment, visual indicator 92 is located within the housing of portable computer system 100, and a optical pipe (or similar type of device) is used to convey the visible signal from visual indicator 92 to a position where the signal is visible to a user.

Visual indicator 92 illuminates or blinks to provide a visual signal or visual alarm to a user. It is appreciated that visual indicator 92 may be situated in a position other than that shown (see FIG. 3 below, for example). It is further appreciated that, in another embodiment, visual indicator 92 may be incorporated into display device 105, such that display device 105 flashes, blinks or otherwise provides a visual alert to a user.

The visual signal can be used to alert a user to an upcoming meeting or appointment, or to alert the user that it is a particular time of day. A visual signal can also be used to alert a user of a particular condition associated with the functions and applications of portable computer system 100 (a "programmed event"). For example, a user may program portable computer system 100 to provide a visual signal as part of a single-player or multi-player game, when an e-mail is received, when battery power is low, when an input error is made, when information is beamed successfully (or not) from one portable device to another, etc. Additional information is provided in conjunction with FIG. 6 below.

With reference still to FIG. 2A, in one embodiment, visual indicator 92 can vary the visual signal in order to indicate different types of conditions or programmed events. For example, the visual signal can blink at a particular rate, blink a prescribed number of times, blink according to a particular pattern (e.g., a combination of longer and shorter blinks), or use different colors to signify the occurrence of different types of events or conditions. It is appreciated that the visual signal can be varied in other ways in accordance with the present invention.

Thus, the present invention can be used to signal a large number of different events or conditions associated with the various applications and functions performed by portable computer system 100, depending on user preferences. In particular, the present invention accomplishes these alert functions in an unobtrusive manner.

In one embodiment, portable computer system 100 also incorporates an audible indicator (not shown) that provides an audible indication or alarm to a user. In this embodiment, visual indicator 92 provides a visual signal in lieu of an audible signal, although it is appreciated that any combination of a visual and audible signal can also be used in accordance with the present invention. It is further appreciated that visual indicator 92 may be enabled or disabled depending on the user's preferences.

Because a visual signal can be used instead of an audible signal, the present invention addresses the shortcomings of an audible signal. Namely, the visual signal generated by visual indicator 92 is not disruptive to others nearby, and it can be used by the hearing impaired. Furthermore, the visual signal makes it easier to identify which device is generating the alarm, and it is suitable for a noisy environment where an audible signal may not be heard.

Figure 2B:
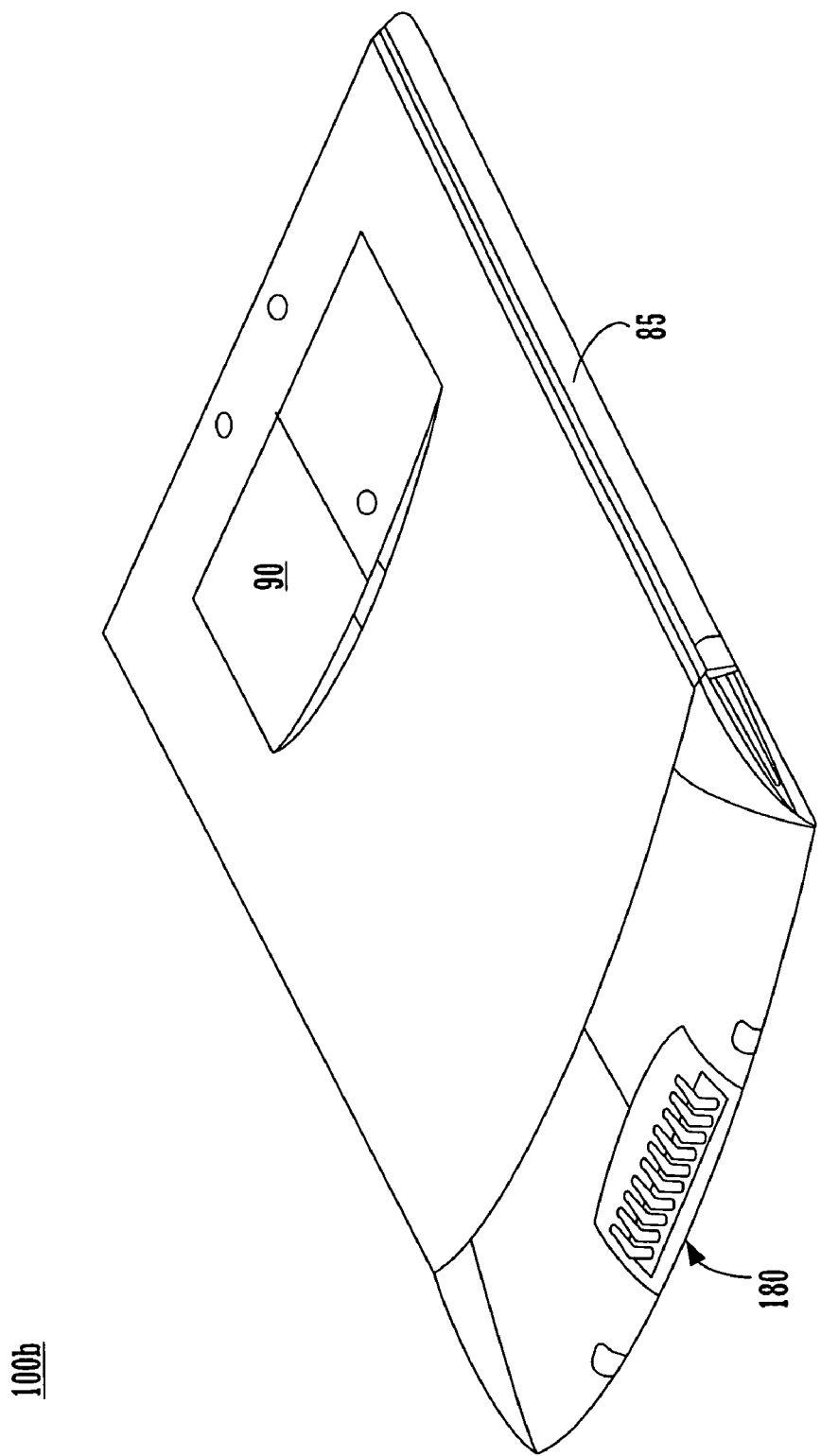
FIG. 2B is a bottom side perspective view of the portable computer system of FIG. 2A.

FIG. 2B illustrates the bottom side 100*b* of the housing of one embodiment of the portable computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 3:
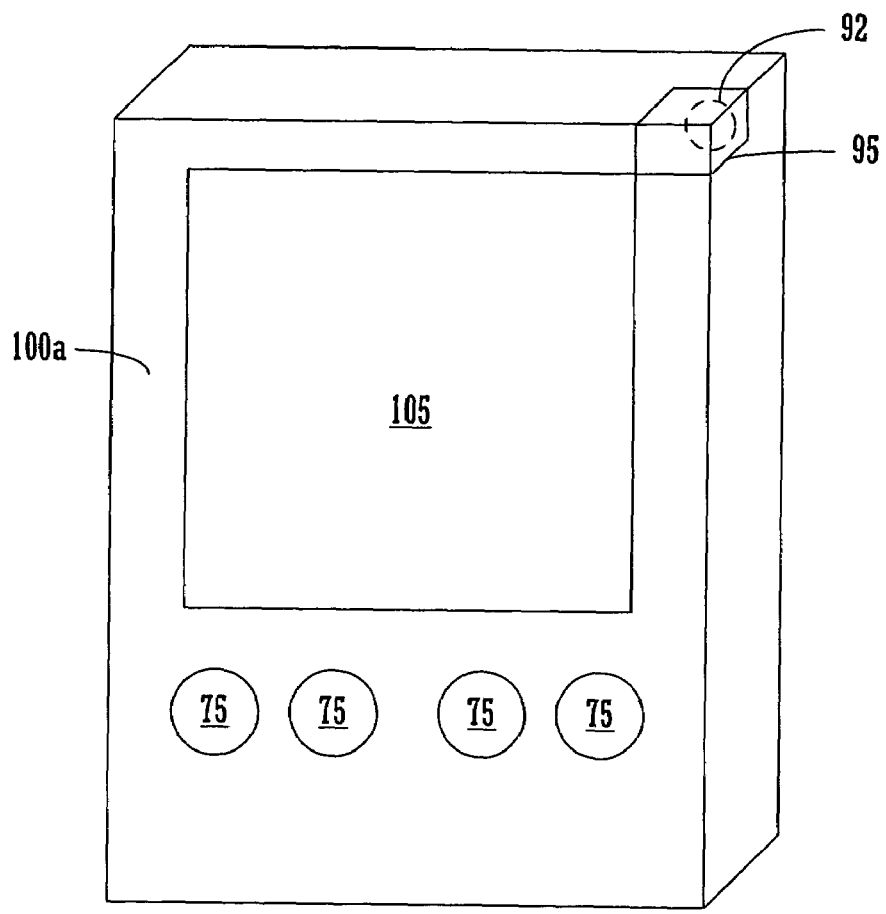
FIG. 3 is a perspective view of a portable computer system with a visual indicator in accordance with another embodiment of the present invention.

FIG. 3 is a perspective view of a portable computer system 100 with a visual indicator 92 in accordance with another embodiment of the present invention. In this embodiment, visual indicator 92 is situated along the top edge of the top face 100a, and as such can be seen by the user whether the user views portable computer system 100 from the front face or on edge. Thus, for example, should a user choose to wear portable computer system 100 attached to a belt, or should the user choose to put portable computer system 100 into his or her pocket, visual indicator 92 would still be visible and thus able to alert a user of a programmed event.

In one embodiment, on/off button 95 is transparent or translucent, and visual indicator 92 is situated beneath on/off button 95 or within the button itself. Thus, a visual signal can be seen through on/off button 95. In the embodiments illustrated in FIGS. 2A and 3, on/off button 95 is situated along the top edge of the top face 100a, and as such the visual signal can be seen by the user whether the user views portable computer system 100 from the front face or on edge, as described above. Accordingly, on/off button 95 performs its normal function and also serves the additional function of emitting a visual signal generated by visual indicator 92. Such a design is advantageous because it efficiently utilizes the limited space available given the compactness of portable computer system 100. It is appreciated that, in other embodiments, other buttons or elements for performing a function or for causing a function to be performed, such as programmable buttons 75, can be made transparent or translucent and combined with visual indicator 92 in a similar manner.

Figure 4:
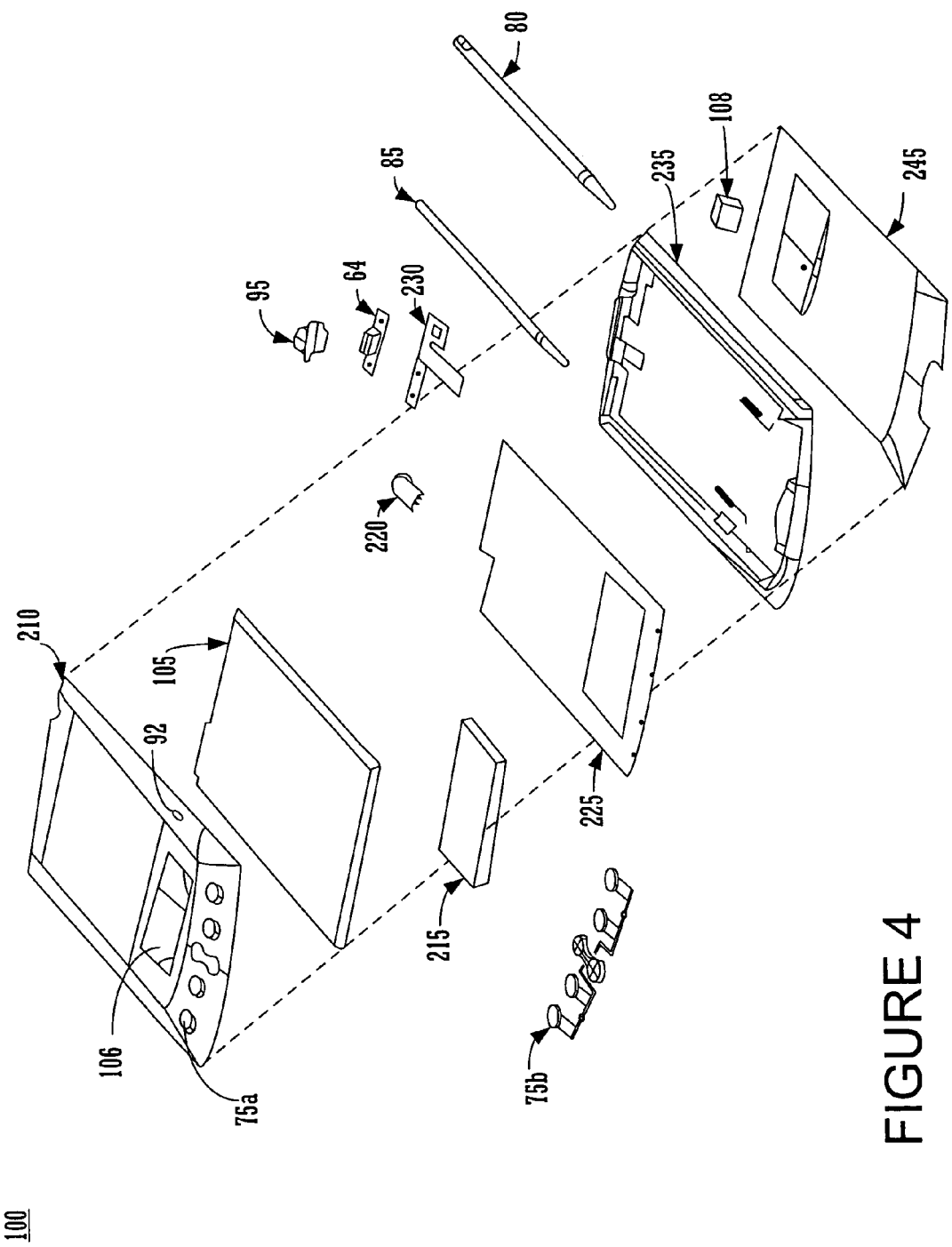
FIG. 4 is an exploded view of the components of a portable computer system in accordance with one embodiment of the present invention.

FIG. 4 is an exploded view of the portable computer system 100 in accordance with one implementation. Computer system 100 has a housing comprised of a back cover 245 and a front cover 210, which has an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Visual indicator 92 is for providing a visual signal to a user, as described above in conjunction with FIG. 2A. In one embodiment of the present invention, a port pin on a microprocessor drives a transistor which allows visual indicator 92 to blink on or off. It is appreciated that other mechanisms and devices can be used to provide and control a visual signal in accordance with the present invention.

Figure 5:
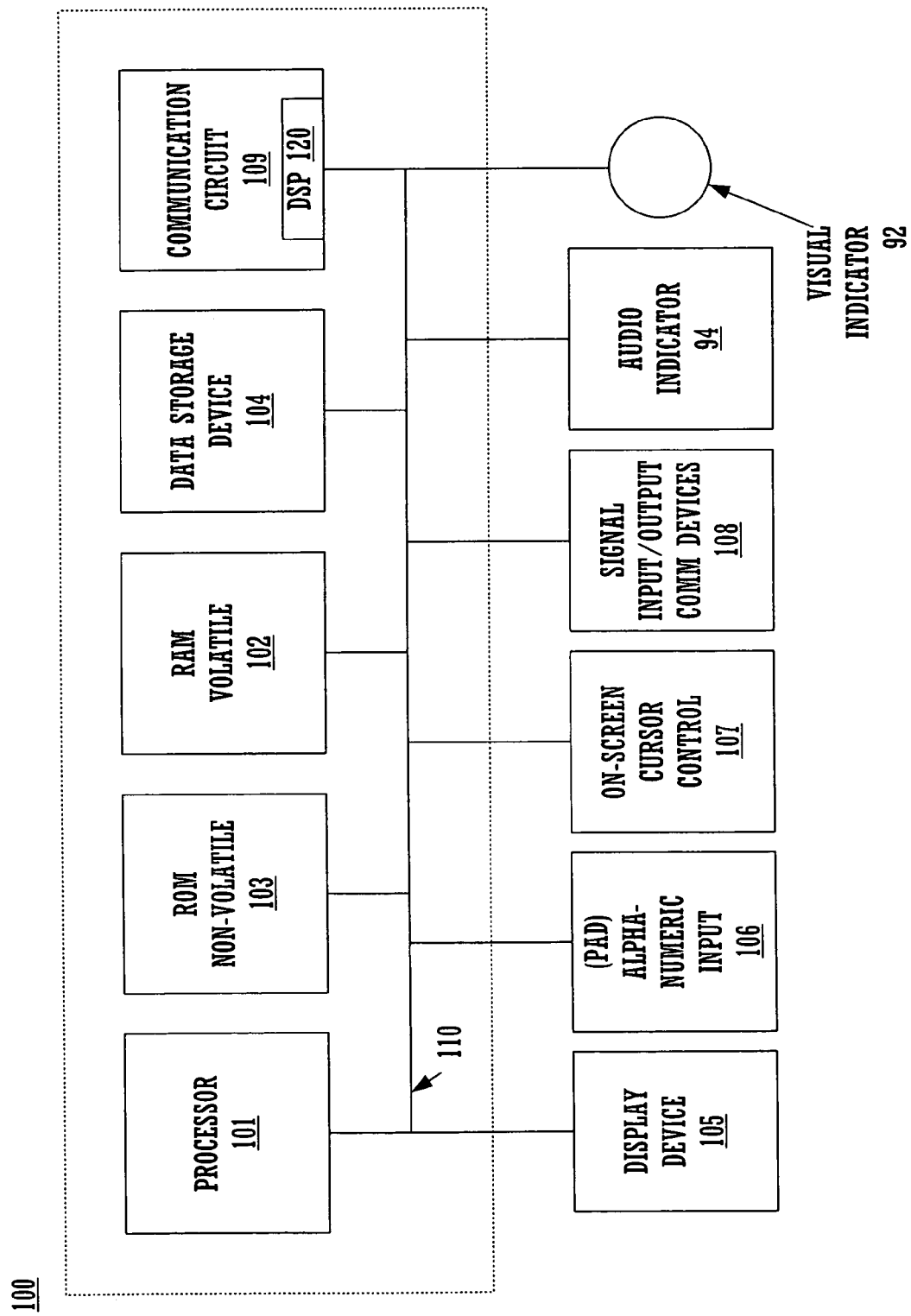
FIG. 5 is a block diagram of one embodiment of a portable computer system with a visual indicator in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

In the present embodiment of the present invention, visual indicator 92 is also coupled to processor 101 and to memory (e.g., RAM 102 or ROM 103) via bus 110. As described previously, visual indicator 92 functions to provide a visual signal or alarm to a user. Portable computer system 100 can be programmed to actuate visual indicator 92 at one or more times of day specified by a user. Visual indicator 92 can also be programmed to alert a user of one or more specified conditions or events associated with the various applications and functions performed by portable computer system 100.

In one embodiment, also coupled to bus 110 is audio indicator 94 for providing an audible signal or alarm to a user. In accordance with the present invention, visual indicator 92 may be used in combination with or in lieu of audio indicator 94. It is appreciated that visual indicator 92 and/or audio indicator 94 may be enabled or disabled depending on the user's preferences.

Method for Visual Silent Alarm Indicator

Figure 6:
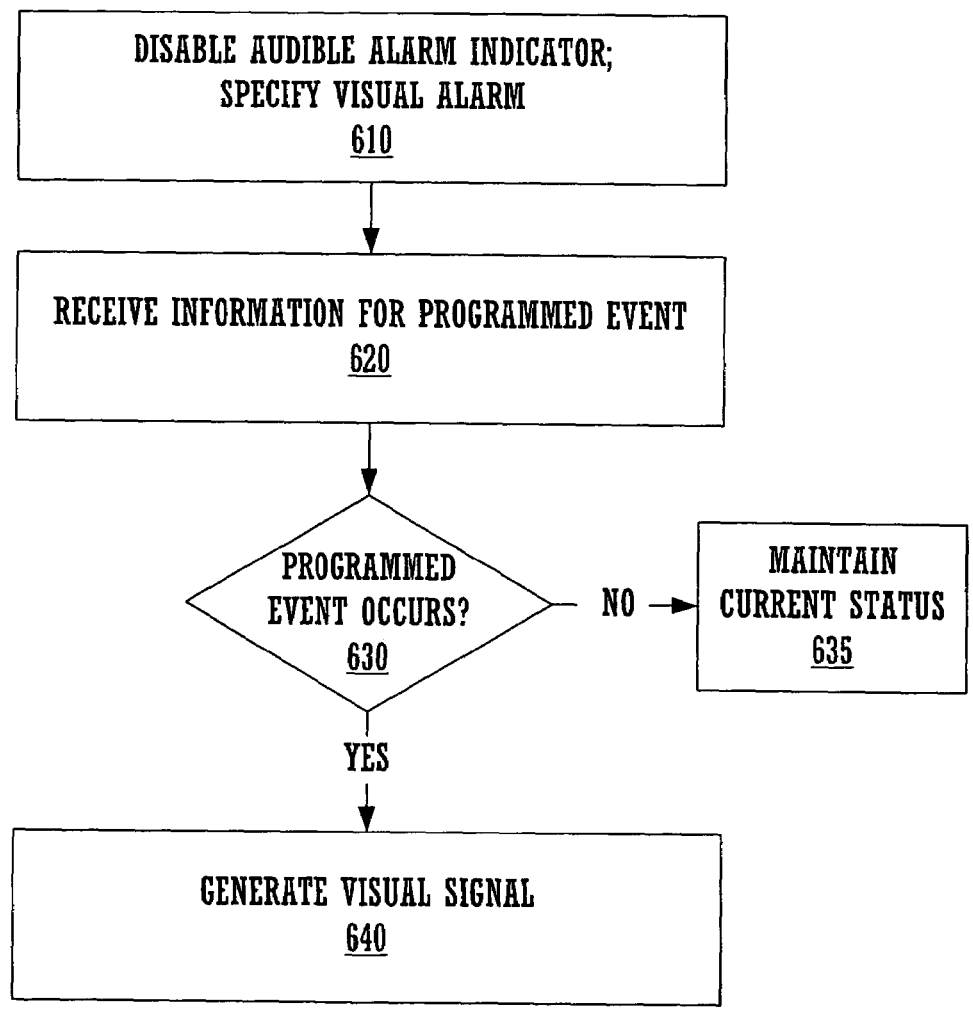
FIG. 6 is a flowchart of the steps in a process for providing a visual indication in accordance with one embodiment of the present invention.

FIG. 6 is a flowchart of the steps in a process 600 for providing a visual indication in a portable computer system 100 (FIG. 5) in accordance with one embodiment of the present invention. In the present embodiment, process 600 is implemented using visual indicator 92 in combination with processor 101 and RAM 102 or ROM 103 of FIG. 5. Various types of dialog boxes and graphical user interfaces can be used by portable computer system 100 to receive the user input described below.

In step 610 of FIG. 6, depending on the user's preferences, the audible alarm (e.g., audio indicator 94 of FIG. 5) is disabled and visual indicator 92 is enabled. It is appreciated that, in accordance with the present invention, the visual signal can be used in lieu of the audible alarm, or that a combination of an audible alarm and a visual signal can be used.

In accordance with the present invention, a separate alarm can be set for any number of individual events or conditions, and each alarm can be signaled either visually or audibly or both. In one embodiment, the user makes a selection with regard to a visual and/or audible alarm when programming into portable computer system 100 the events or conditions for which he or she wishes to be alerted (see step 620).

In step 620 of FIG. 6, portable computer system 100 is programmed with (e.g., receives) information regarding the particular events or conditions that will be signaled to the user. For example, a user selects the calendar function of portable computer system 100 and, in a known fashion, enters information with regard to an upcoming meeting. At this time, the user can also enable or disable the alarm function for this particular meeting. If enabled, the user can specify whether the alarm should be an audible alarm or a visual alarm or both.

In a similar manner, a user can identify other events or conditions for which an alert is to be provided, and can specify whether the alert should be visual and/or audible. For example, a user may program portable computer system 100 to provide a visual signal as part of a single-player or multi-player game, when an e-mail is received, when battery power is low, when an input error is made, when information is beamed successfully (or not) from one portable device to another, etc. In addition, the user may specify certain types of visual signals depending on the type of event or condition. For example, the user may specify that visual indicator 92 should signal an upcoming meeting with a series of blinks according to one pattern, the arrival of an e-mail according to another pattern, and an input error by one relatively long signal.

At step 630 of FIG. 6, if an event or condition programmed by a user does not occur, then portable computer system 100 functions in its normal manner (step 635). When a programmed event does occur (step 640), a visual signal can be generated in accordance with the present invention to alert the user that the event has occurred. For example, for the case where the user wishes to be alerted to an upcoming meeting, the user can program portable computer system 100 to provide an alert a few minutes before the meeting. At the designated time, visual indicator 92 is directed to generate a visual signal. In particular, a specific type of visual signal can be used to indicate that the alert is for an upcoming meeting, as described above.

In summary, the present invention provides an apparatus and method for generating a visual signal for a portable computer system 100 (FIG. 5) that can be used instead of or in combination with an audible signal. As such, the present invention provides an apparatus and method that maintains the functionality of an audible alarm, but addresses the shortcomings of an audible alarm. Namely, the visual signal generated by visual indicator 92 (FIG. 5) is not disruptive to others nearby, and it can be used by the hearing impaired. Furthermore, the visual signal makes it easier to identify which device is generating the alarm, and it is suitable for a noisy environment where an audible signal may not be heard.

The present invention also provides an apparatus and method that can provide alarms for any number of different conditions or events associated with the applications and functions performed by a portable computer system. Importantly, the present invention accomplishes these alert functions in an unobtrusive manner.

The preferred embodiment of the present invention, method and apparatus for visual silent alarm indicator, is thus described. While the present invention has been described in particular embodiments, it should be appreciated that the present invention should not be construed as limited by such embodiments, but rather construed according to the below claims.

What is claimed is:

1. A portable device comprising:
a processor;
a memory unit coupled to said processor;
a user interface coupled to said processor, said user interface comprising a touch screen display and also comprising a handwriting recognition pad;
a first type of indicator coupled to receive a signal from said processor, said first type of indicator adapted to generate a first type of signal at a specified point in time and independent of an occurrence of another event to alert a user that said point in time has been reached; and
a second type of indicator coupled to receive a signal from said processor, said second type of indicator adapted to generate a second type of signal at said specified point in time and independent of an occurrence of another event to alert said user that said point in time has been reached, wherein said second type of indicator is operable to be disabled by said user so that only said first type of indicator provides said alert.

2. The portable device of claim 1 wherein said first type of indicator comprises a visual indicator comprising a single light emitting diode.

3. The portable device of claim 2 wherein said first type of signal is varied to indicate a specific type of event associated with said first type of signal.

4. The portable device of claim 3 wherein said first type of signal is caused to blink at different rates to indicate different types of programmed events.

5. The portable device of claim 3 wherein said first type of signal is caused to change colors to indicate different types of programmed events.

6. The portable device of claim 3 wherein said first type of signal is caused to blink according to different patterns to indicate different types of programmed events.

7. The portable device of claim 2 wherein said first type of signal is visible on both a first surface of a housing and an edge of said housing, wherein said processor and said memory unit are disposed within said housing.

8. The portable device of claim 1 further comprising:
an element adapted to cause said portable device to implement a function, wherein said element is also adapted to emit said first type of signal.

9. The portable device of claim 1 wherein said second type of indicator comprises an audible indicator.

10. A portable device comprising:
a processor;
a memory unit coupled to said processor;
a user interface coupled to said processor, said user interface comprising a touch screen display and also comprising a handwriting recognition pad;
an audible alarm indicator coupled to receive a signal from said processor, said audible alarm indicator adapted to generate an audible signal at a specified point in time independent of an occurrence of another event, said audible indicator functioning as an audible alarm to alert a user that said point in time has been reached, wherein said portable device is programmed with said point in time via said user interface; and
a visual alarm indicator comprising a single light emitting diode and coupled to receive a signal from said processor, said visual indicator adapted to generate a visual signal at said specified time, said visual indicator generating said visual signal at said point in time independent of an occurrence of another event, said visual indicator functioning as a visual alarm to alert said user that said point in time has been reached, wherein said audible indicator can be disabled by the user so that only said visual indicator provides said alert.

11. The portable device of claim 10 wherein said visual signal is varied to indicate a specific type of event associated with said visual signal.

12. The portable device of claim 10 wherein said visual signal is visible on both a first surface of a housing and an edge of said housing, wherein said processor and said memory unit are disposed within said housing.

13. The portable device of claim 10 further comprising:
an element adapted to cause said portable device to implement a function, wherein said element is also adapted to emit said visual signal.

14. A computer-usable medium having computer-readable program code embodied therein for implementing a method for indicating a programmed event, said method comprising:
receiving programming information for a plurality of events via a user interface comprising a touch screen display and also comprising a handwriting recognition pad, said programming information identifying a type of indicator associated with each of said events, said type of indicator selected from a first type of indicator that is adapted to generate a first type of signal and a second type of indicator that is adapted to generate a second type of signal;
in response to said programmed event occurring, determining which of said first type and said second type of indicators is associated with said programmed event; and
causing a portable device to generate a signal selected from said first type and second type of signals according to said determining.

15. The computer-usable medium as recited in claim 14 wherein said first type of indicator comprises a visual indicator comprising a single light emitting diode.

16. The computer-usable medium as recited in claim 15 wherein said method further comprises varying said first type of signal to indicate a specific type of programmed event associated with said first type of signal.

17. The computer-usable medium as recited in claim 16 wherein said method further comprises causing said first type of signal to blink at different rates to indicate different types of programmed events.

18. The computer-usable medium as recited in claim 16 wherein said method further comprises causing said first type of signal to change colors to indicate different types of programmed events.

19. The computer-usable medium as recited in claim 16 wherein said method further comprises causing said first type of signal to blink according to different patterns to indicate different types of programmed events.

20. The computer-usable medium as recited in claim 14 wherein said second type of indicator comprises an audible indicator.

* * * * *